United States Patent
Klein

Patent Number: 6,085,698
Date of Patent: Jul. 11, 2000

[54] NIGHT VISIBILITY ENHANCED CLOTHING AND DOG LEASH

[76] Inventor: Andrei Klein, 10 Marimount Dr., N. Dartmouth, Mass. 02747

[21] Appl. No.: 09/140,609

[22] Filed: Aug. 26, 1998

[51] Int. Cl.[7] .............. A01K 35/00; F21L 15/08
[52] U.S. Cl. .............. 119/859; 362/84; 362/103
[58] Field of Search .............. 119/859, 858, 119/792, 793; 362/84, 103, 106, 108; 428/690

[56] References Cited

U.S. PATENT DOCUMENTS

| | | | |
|---|---|---|---|
| 3,803,437 | 4/1974 | Robinson | 313/483 |
| 4,384,548 | 5/1983 | Cohn | 359/518 |
| 4,595,627 | 6/1986 | Steinman | 442/195 |
| 4,887,552 | 12/1989 | Hayden | 119/793 |
| 4,895,110 | 1/1990 | LoCascio | 119/859 |
| 5,245,516 | 9/1993 | Haas et al. | 362/108 |
| 5,245,517 | 9/1993 | Fenton | 362/156 |
| 5,327,587 | 7/1994 | Hurwitz | 2/422 |
| 5,426,792 | 6/1995 | Murasko | 2/422 |
| 5,479,325 | 12/1995 | Chien | 362/105 |
| 5,564,128 | 10/1996 | Richardson | 2/422 |
| 5,570,945 | 11/1996 | Chien et al. | 362/84 |
| 5,575,004 | 11/1996 | Eisele et al. | 2/1 |
| 5,753,381 | 5/1998 | Feldman et al. | 428/696 |
| 5,804,275 | 9/1998 | Tsunefuji | 428/105 |
| 5,813,148 | 9/1998 | Guerra | 36/137 |
| 5,876,863 | 3/1999 | Feldman et al. | 428/690 |

*Primary Examiner*—Peter M. Poon
*Assistant Examiner*—Yvonne R. Abbott
*Attorney, Agent, or Firm*—Wolf, Greenfield & Sacks, P.C.

[57] ABSTRACT

Articles of apparel and dog leashes for improved visibility of their user in darkened conditions. The articles of apparel and dog leashes are constructed to include an electroluminescent fiber which will render the user of the article of apparel or dog leash visible to others, particularly drivers of automobiles, without the need to have any light shown upon them, greatly reducing the risk of injury. The articles of apparel contemplated by the invention include belts, vests, suspenders and other apparel to be worn in an external location where they are visible.

13 Claims, 4 Drawing Sheets

NIGHT VISIBILITY ENHANCED CLOTHING AND DOG LEASH

FIELD OF THE INVENTION

This invention relates generally to articles for improved night time visibility, and more particularly to clothing and dog leashes which improve the night time visibility of their user.

BACKGROUND OF THE INVENTION

There any many occasions when activities must be, or are desired to be, performed outside at night in locations where traffic or similar hazards are present. For example, people often jog or walk their dog on a street or road after dark. It is also common to perform roadway construction at night when there is less traffic. Those who perform such activities are exposed to the risk that they will not be visible to drivers, bicyclists or others who may strike them resulting in serious injury. Typically, to help prevent such injuries, people performing activities outside after dark wear light colors or reflective materials. However, while these solutions may help in some instances, they are not helpful in others. For example, both light colored clothing and reflective materials require that light shine on the clothing or reflective material for it to be seen. In the case of reflective materials, this light often must come from a specific direction. This means those who are not directly within a car's headlights may not be seen until it is too late. A need therefore exists to for a technique providing enhanced visibility for people performing activities outside after dark.

SUMMARY OF THE INVENTION

The present invention is directed to articles including articles of clothing and dog leashes which incorporate a light source in the form of an electroluminescent fiber (ELF), enabling the user to be readily seen after dark. Electroluminescent fibers are commercially available wires which emit light when an AC electrical voltage is applied to electrodes on one end of the fiber, and work on the same principle as flat electroluminescent panels of the type used as back lighting for liquid crystal displays.

Articles of clothing utilizing this invention include belts, vests and suspenders incorporating ELFs in their construction. The dog leash of the invention includes a handle, a cable, an ELF running alongside of the cable, a circuit for applying an AC signed to the ELF, and a clasp for securing the cable to the collar or harness of a dog.

The foregoing and other objects, features and advantages of the invention shall become apparent from the following more particular description thereof when considered in connection with the accompanying illustrative drawings.

BRIEF DESCRIPTION OF THE DRAWINGS

In the drawings which illustrate the best modes presently contemplated for carrying out the present invention.

Corresponding reference numerals designate corresponding parts throughout the several views of the drawings.

DETAILED DESCRIPTION OF THE PREFERRED EMBODIMENTS

There are several preferred embodiments of this invention which vary with application and personal preference of the user.

Figure 1:
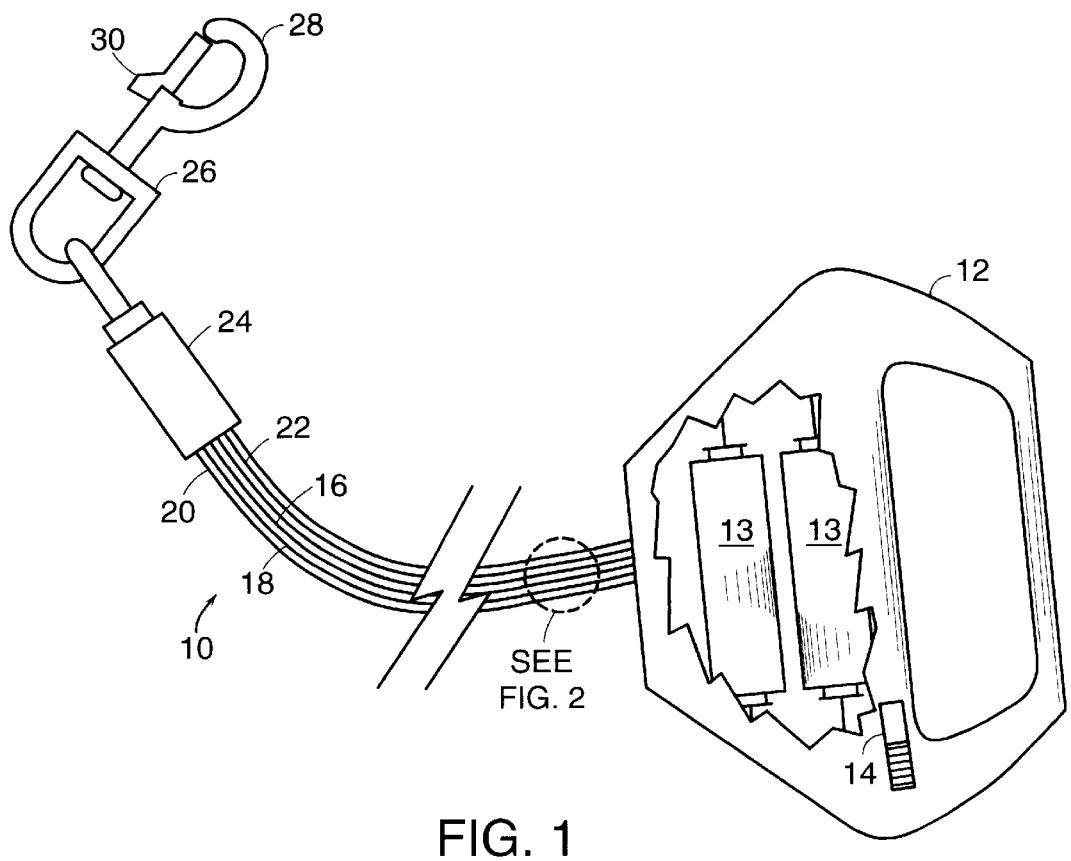
FIG. 1 is a front, partially cut-away view of a dog leash including an ELF according to the present invention.
Figure 6:
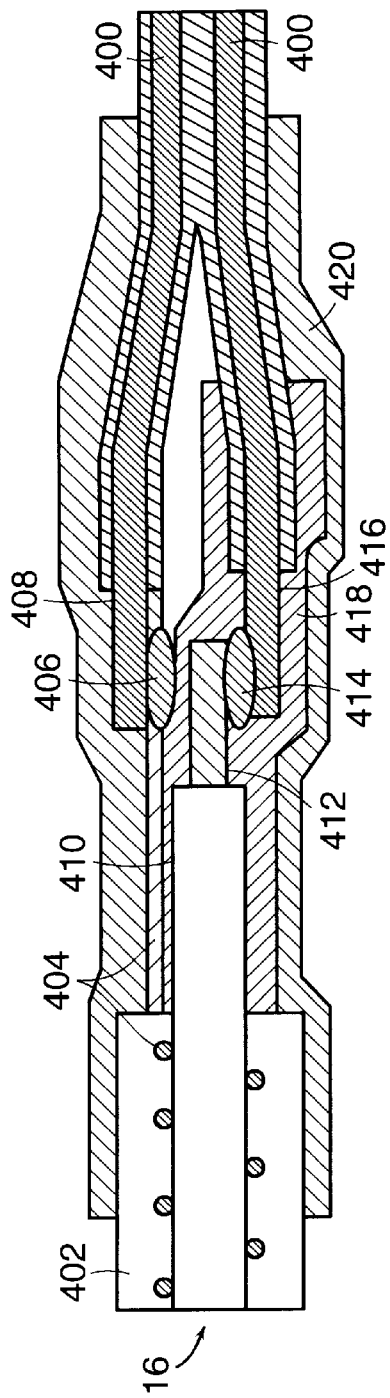
FIG. 6 is an enlarged sectional view of the link between an ELF and a switching apparatus.

Referring now to the drawings, and more particularly to FIG. 1, a dog leash 10 of the present invention incorporates an electroluminescent fiber (ELF) 16. The leash 10 is sturdily constructed and suited for keeping a dog under control. The handle 12 of the leash 10 contains a power source, typically batteries 13, and a switching apparatus 14 for controlling transmission of power from the power source to the ELF 16. The connection between the ELF 16 and switching apparatus 14 is the same for all preferred embodiments of the invention 10, 100, 200, 300, is shown in FIG. 6, and is described in detail below. In this and the other embodiments of the invention the switching apparatus 14 is an on/off switch, of suitable construction.

Figure 2:
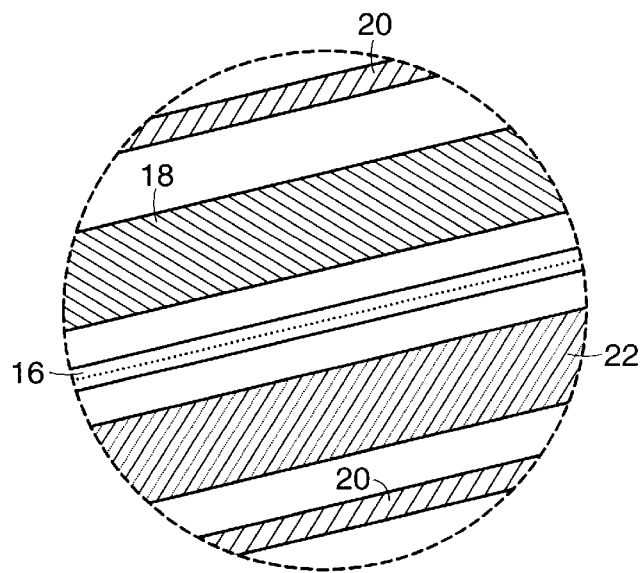
FIG. 2 is an enlarged cross section view of a section of the dog leash shown in FIG. 1.

Connected to the handle 12 is a cable 18, which is preferably steel or other suitable material providing a sturdy but flexible construction. Running along side of, and substantially parallel to, the cable 18 is the ELF 16, which may be either straight, as shown; or wrapped or twisted around the cable 18. Cable 18 and ELF 16 are housed within a flexible, clear tubing 20 constructed, for example, of plastic. A component 22 for daytime visibility may also be provided within tubing 20, such as a cord or ribbon of high visibility material, for example neon fiber. A close-up of the tubing 20, cable 18, ELF 16, and daytime visibility component 22 is depicted in FIG. 2. It is to be understood that the relationship between the elements 16, 18, and 22 in the tubing 20 are shown by way of example only and that they may also be selectively fastened together, twisted together, wrapped around one another, or otherwise laid out relative to each other.

Figure 7:
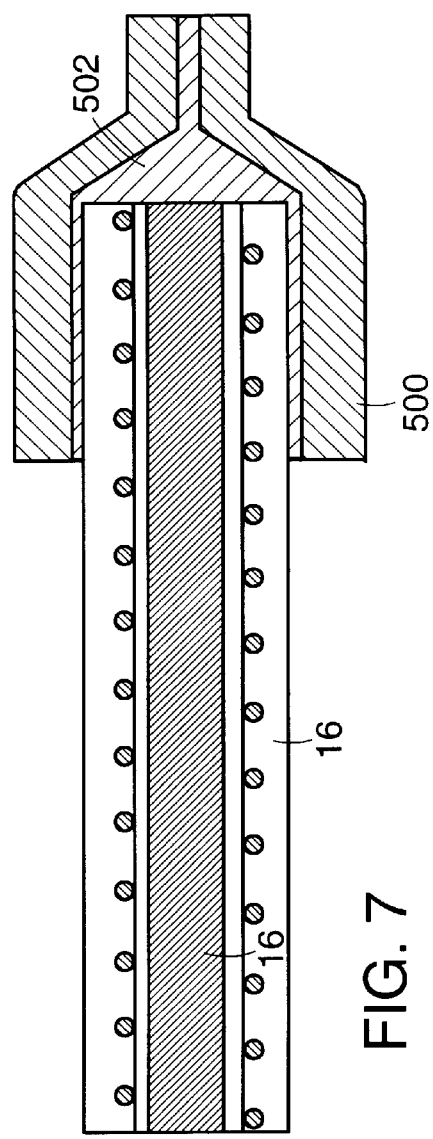
FIG. 7 is an enlarged sectional view of the free end termination for an ELF.

Tubing 20 ends in a cap 24 which attaches to a clasp 26. In this and all preferred embodiments of the invention, the free end of the ELF, 16 is terminated with a shrinkable tube 500 (FIG. 7) and epoxy or other suitable adhesive 502 to reduce moisture penetration. In the leash embodiment 10, the free end of the ELF 16 is within the cap 24 and the daylight visibility component 22 also terminates therein. Cable 18 is fixed to cap 24. Clasp 26 may take a variety of forms which are known in the art to secure leashes to dog collars or harnesses. The clasp 26 shown has a hook 28 with a closure 30 which is held closed by a spring located in the lower portion of hook 28.

Figure 3:
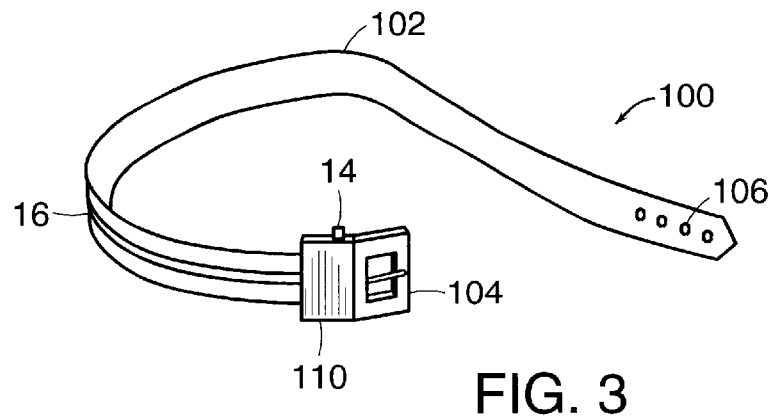
FIG. 3 is a perspective view of a belt including an ELF according to the present invention.

Referring now to FIG. 3, a belt 100 according to the present invention is shown. The belt 100 is preferably constructed of a webbing 102 of brightly colored and reflective fibers, improving both daylight visibility, and nighttime visibility when exposed to light. Belt 100 includes a fastening apparatus 104 which may either be a conventional buckle. as shown, a more simple pull-through loop type buckle, or any similar structure known in the art. If the fastening apparatus 104 is a conventional buckle, holes 106, may be formed in the opposite end of the belt from the buckle. An ELF 16 is fixed to the outside of the belt 100. Fixture of the ELF 16 may be by gluing, by stitches at selected intervals along the ELF or by other techniques known in the art. In this and all of the preferred embodiments of the invention relating to apparel, one end of the ELF 16 terminates in a power supply box 110, which houses a power supply and a switching apparatus 14 for controlling transmission of power from the power source to the ELF 16.

Figure 4A:
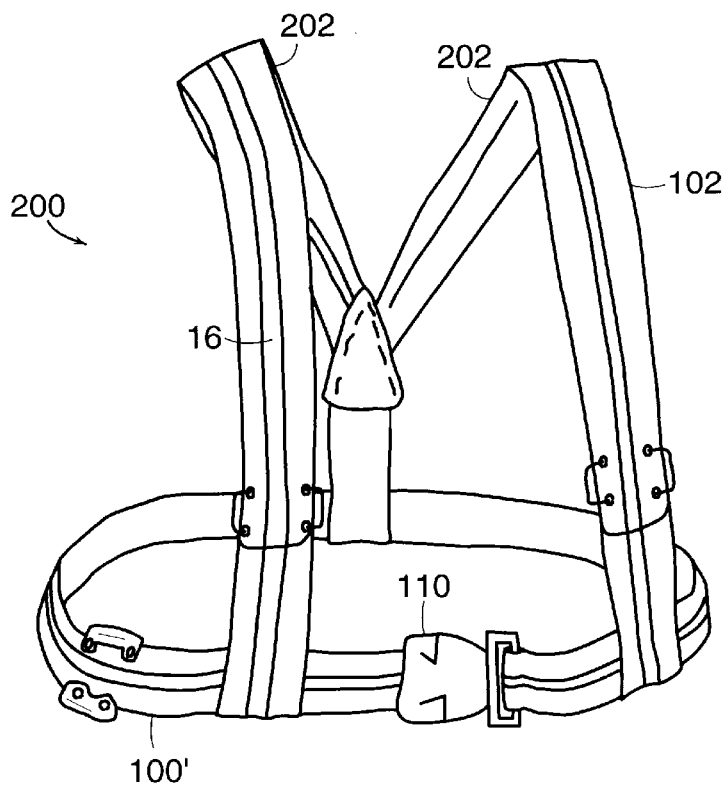
FIGS. 4A and 4B are perspective from and rear view respectively of suspenders including ELFs according to the present invention.
Figure 4B:
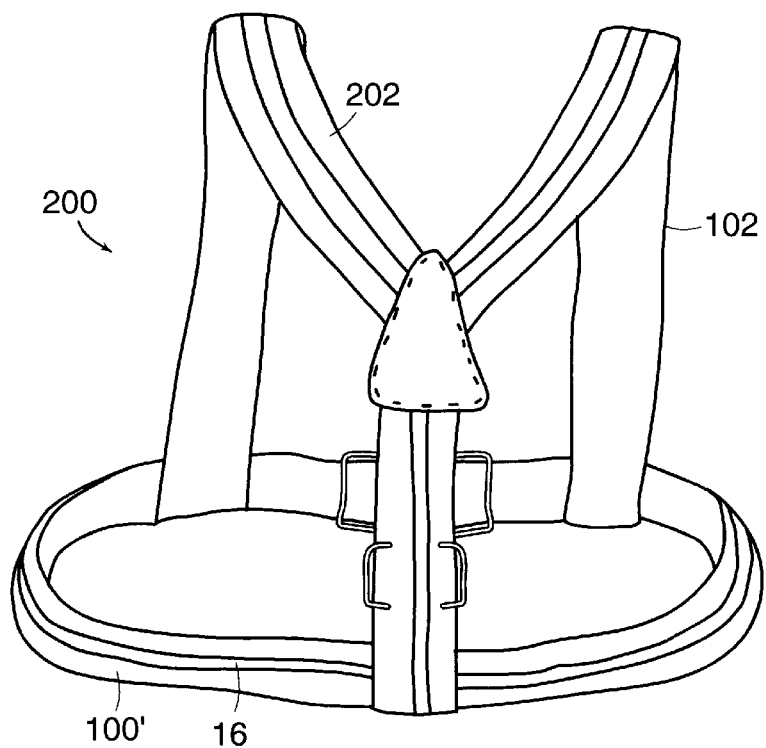

Referring now to FIGS. 4A, 4B, suspenders 200 according to the invention are shown which include shoulder straps 202 with a belt 100'. As for belt 100' all components of suspenders 200 are preferably constructed of a webbing 102 of brightly colored and reflective fibers. An ELF 16 is fixed to the outside surfaces of both straps 202 and belt 100' of the suspenders 200. One end of the ELF 16 terminates in a power supply box 110, which houses a power supply and a switching apparatus 14 for controlling transmission of power from the power source to the ELF 16.

Figure 5:
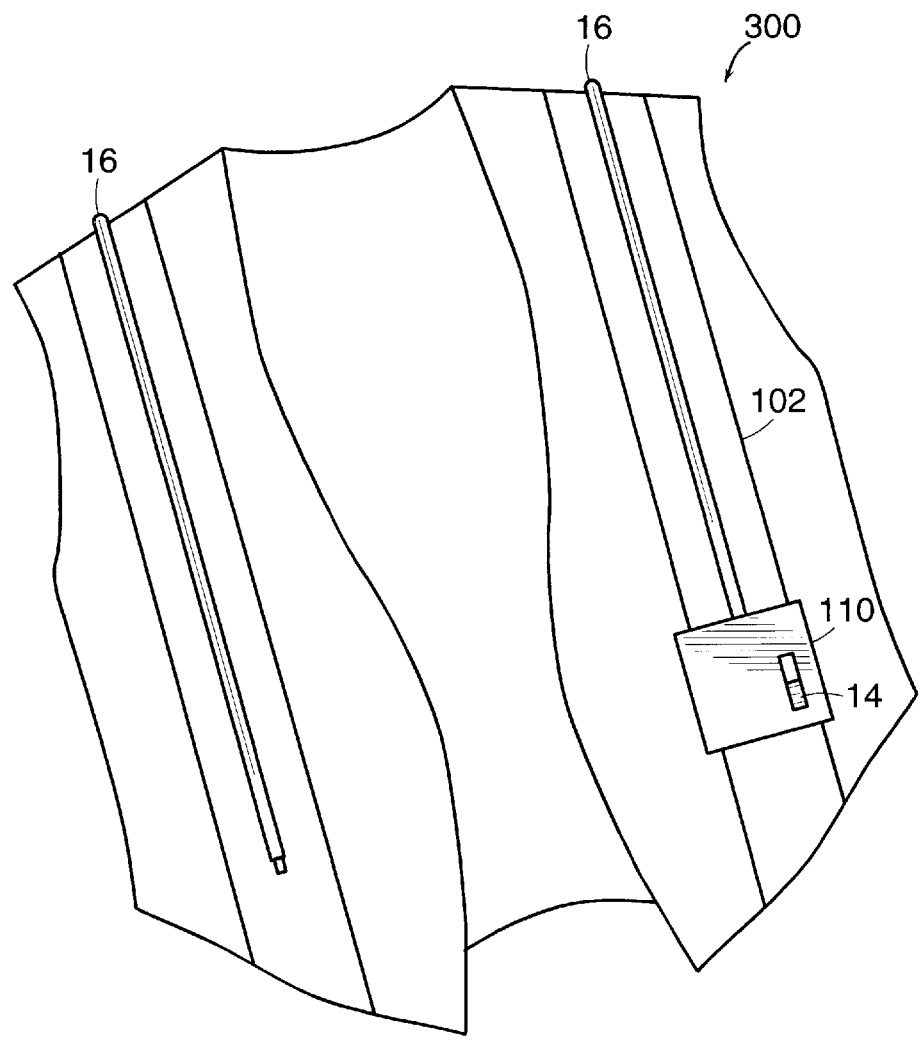
FIG. 5 is a perspective view of a vest including ELFs according to the present invention.

Referring now to FIG. 5, a vest 300 according to the present invention is shown. Webbing 102 of brightly colored and reflective fibers is attached to the vest 300. An ELF 16 is fixed to the outside of the vest 300 over the webbing 102. Though the ELF 16 need not be fixed to the vest 300 where the webbing is located, this is preferred for aesthetic reasons and because, during manufacture, the ELF 16 can be fixed to the webbing 102 and then the webbing fixed to the vest. One end of the ELF 16 terminates in a power supply box 110, which houses a power supply and a switching apparatus 14 for controlling transmission of power from the power source to the ELF 16. From the power supply 110 the ELF, 16 passes onto the back of the vest 300 and then returns to the front of the vest on the opposite side, where it is terminated.

FIG. 6 depicts the contact between the ELF 16 and the dual conductor insulated wire 400 attached to the switching apparatus 14. The external insulator 402 of the ELF 16 has been removed exposing additional electrodes 404 which are attached at a first contact 406 to the first side 408 of the dual conductor insulated wire 400. Similarly, the external insulator 410 of the internal electrode 412 has been removed and attached at a second contact 414 to the second side 416 of the dual conductor insulated wire 400. A first sheath 418 covers second contact 414 and a second sheath 420 covers the entire contact area.

The operation and advantages of the present invention will be readily understood in light of the above description. It is clear that the preferred embodiments 10, 100, 200, 300 of this invention are particularly useful to those who perform activities outside after dark, and in particular that they permit easy visibility for the user even in the absence of light from headlights or other source impinging of the user.

While there is shown and described herein certain specific structures embodying the invention, it will be apparent to those skilled in the art that the teachings of this invention could be used with other externally worn articles of apparel, that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An article, which is at least one of a dog leash and an article of clothing crafted for enhanced night visibility including:

a length of electroluminescent fiber (ELF) forming part of the article;

a web of threads to which said length of ELF is at least in part affixed, wherein the web of threads includes reflective threads;

a power source; and a switching apparatus, the power source being connected to the ELF through the switching apparatus, which apparatus controls transmission of power from the power source to the ELF.

2. The article of claim 1, wherein said web of threads having the ELF affixed thereto is attached to an external surface of an article of clothing.

3. The article of claim 1, including a fastening apparatus facilitating the use of the web of threads as a belt.

4. The article of claim 1, wherein the web of threads having the ELF affixed thereto is attached to a vest.

5. The article of claim 1, wherein the web of threads having the ELF affixed thereto is incorporated into suspenders.

6. An enhanced night visibility dog leash including:

a handle;

a cable attached to the handle at a first end thereof;

an electroluminescent fiber (ELF) extending alongside the cable;

a web of threads including reflective threads extending alongside the cable;

a power source;

a switching apparatus which controls transmission of power from the power source to the ELF; and a clasp attached to a second end of the cable.

7. The dog leash of claim 6 wherein the cable and electroluminescent fiber are housed within a length of flexible, clear tubing.

8. The dog leash of claim 7 wherein the length of flexible, clear tubing also contains a component for improving daytime visibility.

9. An enhanced night visibility article of clothing including:

an electroluminescent fiber (ELF) fixed to the article of clothing;

a web of threads to which said ELF is at least in part affixed, wherein the web of threads includes reflective threads;

a power source; and a switching apparatus for controlling transmission of power from the power source to the ELF.

10. The article of claim 9, wherein the article of clothing is a belt, the web with the ELF fixed thereto forming part of the belt.

11. The article of claim 9, wherein the article of clothing is a vest, the web with the ELF fixed thereto forming part of the vest.

12. The article of claim 9, wherein the article of clothing is suspenders, the web with the ELF fixed thereto forming part of the suspenders.

13. The article of claim 9 wherein said article of clothing is one of a belt, a vest, and suspenders.

* * * * *